Figure 1:
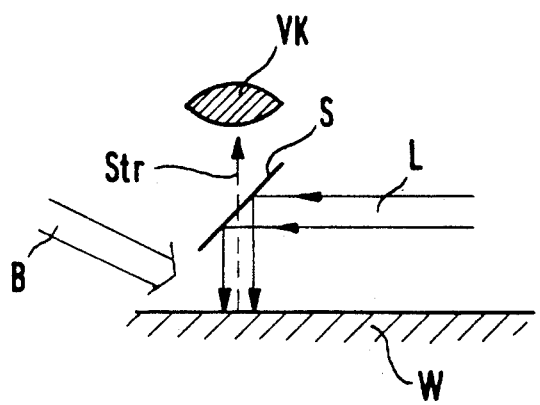

United States Patent [19]

Kahlert et al.

[11] Patent Number: 5,173,584
[45] Date of Patent: Dec. 22, 1992

[54] METHOD AND APPARATUS FOR MONITORING THE WORKING OF A WORKPIECE WITH PULSED LASER RADIATION

[75] Inventors: Hans-Jürgen Kahlert; Ulrich Sowada, both of Göttingen, Fed. Rep. of Germany

[73] Assignee: Lambda Physik Forschungsgellschaft, Fed. Rep. of Germany

[21] Appl. No.: 688,735

[22] Filed: Apr. 19, 1991

[30] Foreign Application Priority Data

Apr. 25, 1990 [DE] Fed. Rep. of Germany ....... 4013195

[51] Int. Cl.⁵ .............................................. B23K 26/02
[52] U.S. Cl. ........................... 219/121.83; 219/121.76
[58] Field of Search ...................... 219/121.76, 121.77, 219/121.84, 121.6, 121.85, 121.83

[56] References Cited

U.S. PATENT DOCUMENTS

| | | | |
|---|---|---|---|
| 4,733,047 | 3/1988 | Cruickshank et al. | 219/121.63 |
| 4,734,550 | 3/1988 | Imamura et al. | 219/121.77 |
| 4,873,413 | 10/1989 | Uesugi et al. | 219/121.68 |
| 4,918,284 | 4/1990 | Weisz | 219/121.78 |
| 4,952,770 | 8/1990 | Hayashi | 219/121.67 |
| 5,017,755 | 5/1991 | Yahagi et al. | 219/121.68 |

Primary Examiner—C. L. Albritton
Attorney, Agent, or Firm—William T. French; Michael L. Goldman; Robert L. Carlson

[57] ABSTRACT

For monitoring the working of a workpiece (W) with pulsed radiation of an excimer laser the workpiece surface is periodically illuminated with visible light (B) synchronously with at least some of the laser pulses. A mirror arrangement (S) separates visible light from ultraviolet laser light so that an image corresponding to the working operation can be picked up with a video camera (VK).

2 Claims, 1 Drawing Sheet

METHOD AND APPARATUS FOR MONITORING THE WORKING OF A WORKPIECE WITH PULSED LASER RADIATION

For working with workpieces, in particular in automated production methods, lasers are being increasingly employed because with constant radiation parameters they permit an always identical working of the workpiece. In a great number of workpiece processing operations excimer lasers are used which emit pulsed laser radiation in the ultraviolet range.

The workpieces are moved here with relatively high velocity (for example 1 meter per second) and the pulse repetition frequency of the laser radiation may be relatively high (up to several hundred radiation pulses per second).

In such fast material working operations it is also important to monitor the working location, i.e. the location of the interaction of the laser radiation with the processed workpiece must lie within predetermined tolerances and be monitored accordingly to permit an on-line quality control.

The invention is based on the problem of providing an apparatus and a method for monitoring the working of a workpiece with pulsed laser radiation which permit a direct determination of the interaction between laser radiation and workpiece.

The apparatus according to the invention and a corresponding method for solving this problem are characterized with further developments in the patent claims.

Figure 2:
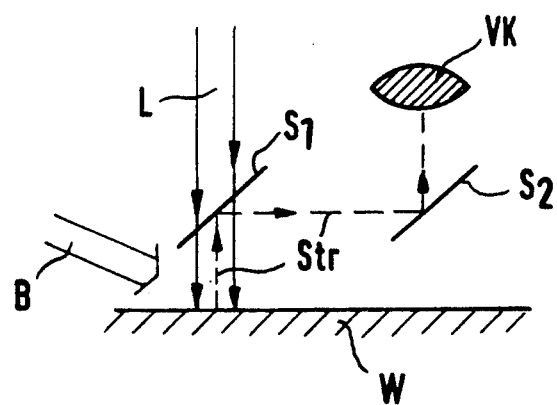

Hereinafter some examples of embodiment of the invention will be explained in detail with the aid of the drawings, wherein:

FIG. 1 shows a first example of embodiment of an apparatus for monitoring the working of a workpiece with pulsed laser radiation and FIG. 2 shows a further example of embodiment of such an apparatus.

In the Figures, corresponding components are provided with the same reference numerals.

A workpiece W is to be worked with ultraviolet laser radiation L. For example, a micromaterial working is to be carried out. The laser radiation L comes from an excimer laser (not shown) and consists of laser pulses of high frequency. The workpiece W is moved with respect to the laser radiation L to perform workings at various points of the workpiece. The laser radiation is focussed (not shown in the Figures).

In both examples of embodiment the worked region of the workpiece W is illuminated periodically with visible radiation B. The illumination with the radiation B is with a flashlamp stroboscope arrangement (not shown).

The stroboscope lamp is externally triggered in the example of embodiment illustrated by a synchronizing pulse which also controls the initiation of the laser pulse. Consequently, the illumination of the region of the workpiece W worked by the laser radiation L can take place synchronously in time with the laser pulses. When the material of the workpiece W worked with the laser radiation L emits a luminous effect in the visible range of the electromagnetic spectrum during or after the working, said effect can be perceived by means of the momentary stroboscope illumination optically as well and the location of the working detected with respect to other parts of the workpiece, such as a marking, when the workpiece moves. The pulse duration of the periodic stroboscope illumination is dependent upon the desired resolution related to the movement velocity of the workpiece W. For example, a short pulse duration of the stroboscope illumination of less than 10 microseconds with a movement velocity of the workpiece W of 1 m/s can generate a relatively sharp image in which the edge blurring is only 0.01 mm.

The radiation B used to illuminate the worked region of the workpiece W lies in the visible range of the spectrum. According to the invention, radiation Str in the visible range of the spectrum reflected or emitted from the worked region of the workpiece W is picked up by a video camera VK, an image being obtained which represents the instantaneous working operation on the workpiece surface.

The monitoring apparatus consists in the two examples of embodiment of FIGS. 1 and 2 in each case of a stroboscope illumination (radiation B), a mirror arrangement and a video camera.

In the example of embodiment according to FIG. 1 the pulsed laser radiation L is deflected with the aid of a dielectrically coated mirror S in such a manner that it strikes the workpiece W. The mirror S is highly transparent to visible light. In FIG. 1 the visible radiation is indicated by the reference numeral Str. It passes from the worked area of the workpiece W through the mirror S directly to the video camera VK. This arrangement employing a dielectrically coated mirror S has the advantage that the laser radiation absorbed at the mirror layer is relatively small, permitting a long life of the mirror.

In the example of embodiment according to FIG. 2 a mirror $S_1$ is used which allows the laser light (in both examples of embodiment excimer laser light in the ultraviolet range) to pass unattenuated but deflects visible radiation Str. To cancel the right/left reversal occurring on reflection of the visible radiation Str at the mirror $S_1$ a further mirror $S_2$ is arranged in the beam path of the visible radiation Str between the workpiece W and video camera VK.

If it is desired to reduce the loading of the stroboscope lamp generating the visible illumination radiation B it is possible to synchronize the triggering of the stroboscope lamp with respect to the laser radiation via an electronic scaler, i.e. it is thus possible to generate an illumination beam B for example only synchronously with every fourth laser pulse and to spare the stroboscope lamp therebetween, leading to an increased life and greater amount of light per lamp pulse, in particular when using flashlamps.

We claim:

1. A method of monitoring the working of a workpiece (W) comprising the steps of
   a) directing a pulsed ultraviolet laser beam (L) onto said workpiece (W),
   b) providing markings on said workpiece,
   c) moving said workpiece relative to said pulsed ultraviolet laser beam such that successive pulses of said pulsed ultraviolet laser beam impinge onto a plurality of different points of said workpiece,
   d) directing pulses of visible light onto said plurality of different points of the workpiece, wherein said pulses of visible light are synchronized with said successive pulses of the pulsed ultraviolet laser beam, and
   e) monitoring said plurality of different points of the workpiece together with said markings by means of a camera (VK) which is sensitive to visible light.

2. A method of monitoring the working of a workpiece (W) comprising the steps of
a) directing a pulsed ultraviolet laser beam (L) onto said workpiece (W),
b) providing markings on said workpiece,
c) moving said workpiece relative to said pulsed ultraviolet laser beam such that successive pulses of said pulsed ultraviolet laser beam impinge onto a plurality of different points of said workpiece,
d) directing pulses of visible light onto said plurality of different points of the workpiece, wherein said pulses of visible light are synchronized with selected pulses of the pulsed ultraviolet laser beam, and
e) monitoring said plurality of different points of the workpiece together with said markings by means of a camera (VK) which is sensitive to visible light.

* * * * *